(12) United States Patent
Bollman (10) Patent No.: US 6,778,684 B1
(45) Date of Patent: Aug. 17, 2004

(54) SYSTEMS AND METHODS FOR CHECKING IMAGE/DOCUMENT QUALITY

(75) Inventor: James E. Bollman, Williamson, NY (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/487,805

(22) Filed: Jan. 20, 2000

(51) Int. Cl.[7] .................................................. G06K 9/00
(52) U.S. Cl. ..................................... 382/112; 382/167
(58) Field of Search .............................. 382/112, 110, 382/113, 167, 274, 309, 310

(56) References Cited

U.S. PATENT DOCUMENTS

| | | | |
|---|---|---|---|
| 5,687,250 A | * 11/1997 | Curley et al. | 382/112 |
| 6,101,000 A | * 8/2000 | Murray et al. | 358/1.9 |
| 6,178,010 B1 | * 1/2001 | Takenouchi et al. | 358/1.9 |
| 6,268,936 B1 | * 7/2001 | Truc et al. | 358/487 |

OTHER PUBLICATIONS

White, Jan, "Color for the Electronic Age", 1990, Watson–Guptil Publication.*
Bernice E. Rogowitz and David A. Rabenhorst, *CRAFT: A Tool for Customizing Color and Font Selections Guided by Perceptual Rules*, IS&T and SID's Color Imaging Conference: Transforms & Transportability of Color (1993) pp. 140–143.

* cited by examiner

Primary Examiner—Brian Werner
Assistant Examiner—Ryan J. Miller
(74) Attorney, Agent, or Firm—Oliff & Berridge, PLC (57) ABSTRACT

A method and apparatus for modifying the perceived quality of a document or image. The method includes inputting image or document data representing the image or document to be modified, analyzing the image or document data for one or more objects, evaluating the objects as one or more of acceptable, improvable or deficient based on one or more quality factors. For each object that is evaluated as other than acceptable, the method and apparatus creates, displays and possibly applies a quality recommendation for the objects.

21 Claims, 8 Drawing Sheets

SYSTEMS AND METHODS FOR CHECKING IMAGE/DOCUMENT QUALITY

BACKGROUND OF THE INVENTION

1. Field of Invention

This invention relates to image processing and document preparation.

2. Description of Related Art

A document or image may be created using many methods. For example, Microsoft™ PowerPoint®, Word®, Front Page®, Works®, and Adobe™ PhotoShop®, and many other applications can be used by users to create electronic documents. Image data may be created by using a digital camera, a scanner, or a facsimile machine. The documents or images can also be created by starting from a template that has good quality characteristics.

Alternatively, the images can be created from scratch based on the user's experience in creating documents to create a document or image that conveys the information in an effective manner. Experienced users are familiar with the rules for quality in document and image creation. The methods for quality combinations of colors are discussed, for example, in "Color for the Electronic Age" by Jan White, Watson-Guptill Publications, 1990 incorporated herein by reference in its entirety.

SUMMARY OF THE INVENTION

There are numerous ways for a user to fail when attempting to create a image or document hereafter collectively referred to as image data. For example, colors may clash, text may be too small, different colors having the same luminance may be confusing to color-blind persons, etc. Related methods for improving quality include user instruction, templates and independent reviews.

This invention provides systems and methods that allow a user to improve or modify image quality or enhance features of the image by generating recommendations based on an automatic analysis of the image or document.

Thus, a user does not need to learn intricate rules regarding color quality in a document or image to create a quality color image or document. The recommendations may also be applied automatically.

These and other features and advantages of this invention are described in or are apparent from the following detailed description of various exemplary embodiments of the systems, methods and graphical user interfaces according to this invention.

BRIEF DESCRIPTION OF THE DRAWINGS

The invention will be described in relation to the following drawings in which reference numerals refer to like elements, and wherein.

DETAILED DESCRIPTION OF PREFERRED EMBODIMENTS

Figure 1:
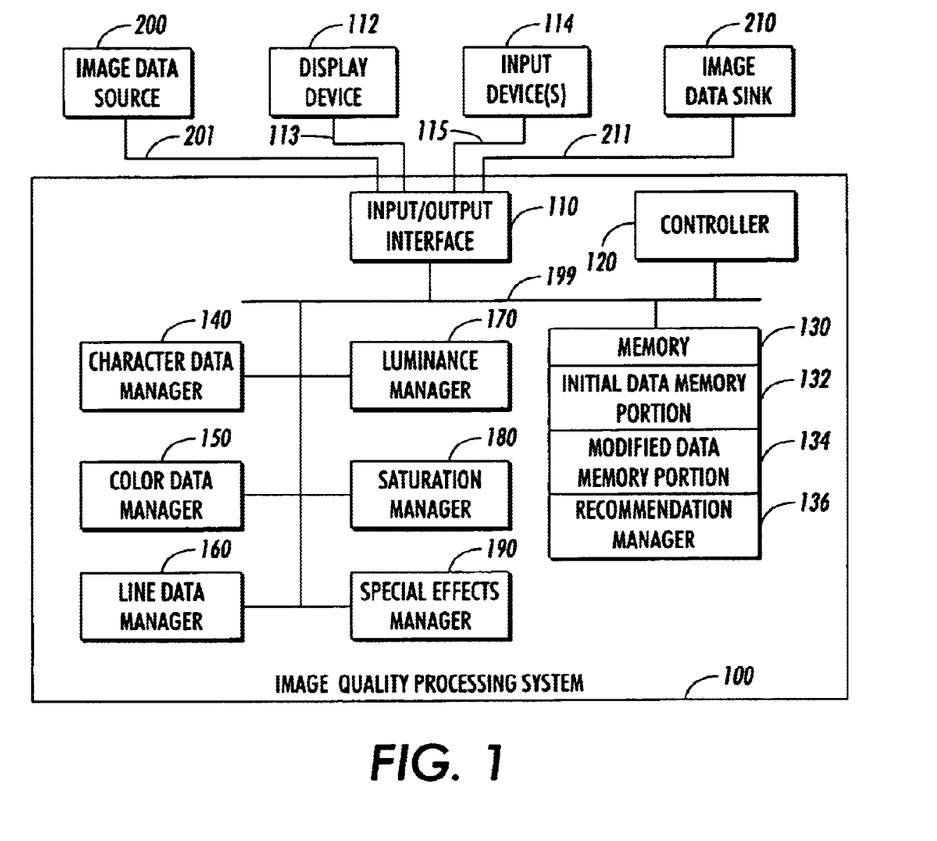
FIG. 1 is an exemplary embodiment of the apparatus for checking image quality.

FIG. 1 shows a functional block diagram of an interactive automatic image quality processing system and apparatus 100 according to this invention. As shown in FIG. 1, the interactive automatic image quality processing system 100 includes a input/output interface 110, a controller 120, a memory 130, one or more image quality modification managers, including a character data manager 140, a color data manager 150, a line data manager 160, a luminance manager 170, a saturation manger 180, and a special effects manager 190, each interconnected by a data/control bus 199.

The memory 130 can include an initial data memory portion 132, a modified data memory portion 134 and a recommendation manager 136, as well as additional memory portions as needed.

A display device 112 and one or more input devices 114 are connected over the links 113 and 115, respectively, to the input/output interface 110.

An image data source 200 is connected to the input/output interface 110 by a link 201, and supplies image data or document data, hereinafter collectively referred to as image data, to the interactive automatic image quality processing system 100. The input/output interface 110, under control of the controller 120, provides the image data to the memory 130.

The controller 120 then calls one or more of the character data manager 140, the color data manager 150, the line data manager 160, the luminance manager 170, the saturation manger 180, the special effects manager 190, or any other manager included with the interactive automatic image quality processing system 100, to analyze the image data and to create recommendations for modifying the image data.

The recommendations for modifying the image data generated from one or more of the character data manager 140, the color data manager 150, the line data manager 160, the luminance manager 170, the saturation manger 180, the special effects manager 190 or any other provided-manager can be passed to the recommendation manager 136, stored in the memory 130, and/or stored within the originating manager.

The recommendations are output by the input/output interface 110, under control of the controller 120, to the display device 112. A user can use the one or more input devices 114 to provide control signals to the interactive automatic image quality processing system 100, for example, to accept or reject various recommendations. Alternatively, the controller 120 can make some or all decisions for the user about invoking various mangers, modifying the image data, and outputting the image data to any of the display device 112 or the image data sink 210.

The image data source 200 can be a digital camera, a scanner, or a locally or remotely located computer, or any other known or later developed device as capable of generating electronic image data. Similarly, the image data source 200 can be any suitable device that stores and/or transmits electronic image data such as a client or a server of a network. The image data source 200 can be integrated with the interactive automatic image quality processing system 100, such as in a digital copier having an integrated scanner. Alternatively, the image data source 200 can be connected to the interactive automatic image quality processing system 100 over the link 201. It should also be appreciated that, while the electronic image data can be generated at the time that the image data is supplied to the interactive automatic image quality processing system 100, the electronic image data could have been generated at any time in the past. Moreover, the electronic image data need not have been generated from an original physical document, but could have been created from scratch or electronically. The image data source 200 can thus be any known or later developed device which is capable of supplying electronic image data over the link 201 to the interactive automatic image quality processing system 100.

Similarly, an image data sink 210 is connected to the interface 110 by a link 211. The image data sink 210 uses the processed image data generated by the interactive automatic image quality processing system 100. The image data sink 210 can be any device that is capable of outputting or storing the processed image data generated by the interactive automatic image quality processing system 100. Thus, the image data sink 210 can be a printer, a copier, or other image forming device, a facsimile device, a display device, a memory, the Internet or the like.

Each of the links 113, 115, 201 and 211 can be any known or later developed device or system for connecting the display device 112, the one or more input devices 114, the image data source 200 and the image data sink 210, respectively to the interactive automatic image quality processing system 100. Thus, each of the links 113, 115, 201 and 211 can be implemented as a direct cable connection, a connection over a wide area network or a local area network, a connection over an Internet, a connection over an externet, a connection over any other known or later developed distributed processing network or system, a connection over the public switch telephone network, or a wireless connection. In general, each of the links 113, 115, 201 and 211 can be any known or later developed connection system or structure usable to connect the display device 112, the one or more input devices 114, the image data source 200 and the image data sink 210, respectively, to the interactive automatic image quality processing system 110, and can include both wired and wireless portions.

It should be understood that each of the circuits shown in FIG. 1 can be implemented as portions of suitably programmed general purpose computer, a programmed microprocessor or microcontroller and peripheral integrated circuit elements. Alternatively, each of the circuits shown in FIG. 1 can be implemented as physically distinct hardware circuits within an ASIC, or using a FPGA, a PDL, a PLA, or a PAL, or using discrete logic elements or discrete circuit elements. The particular form of each of the circuits shown in FIG. 1 will be a design choice and will be obvious and predictable to those skilled in the art.

The memory 130 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writable or re-rewriteable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DEV-ROM disk, and disk drive or the like.

Figure 2:
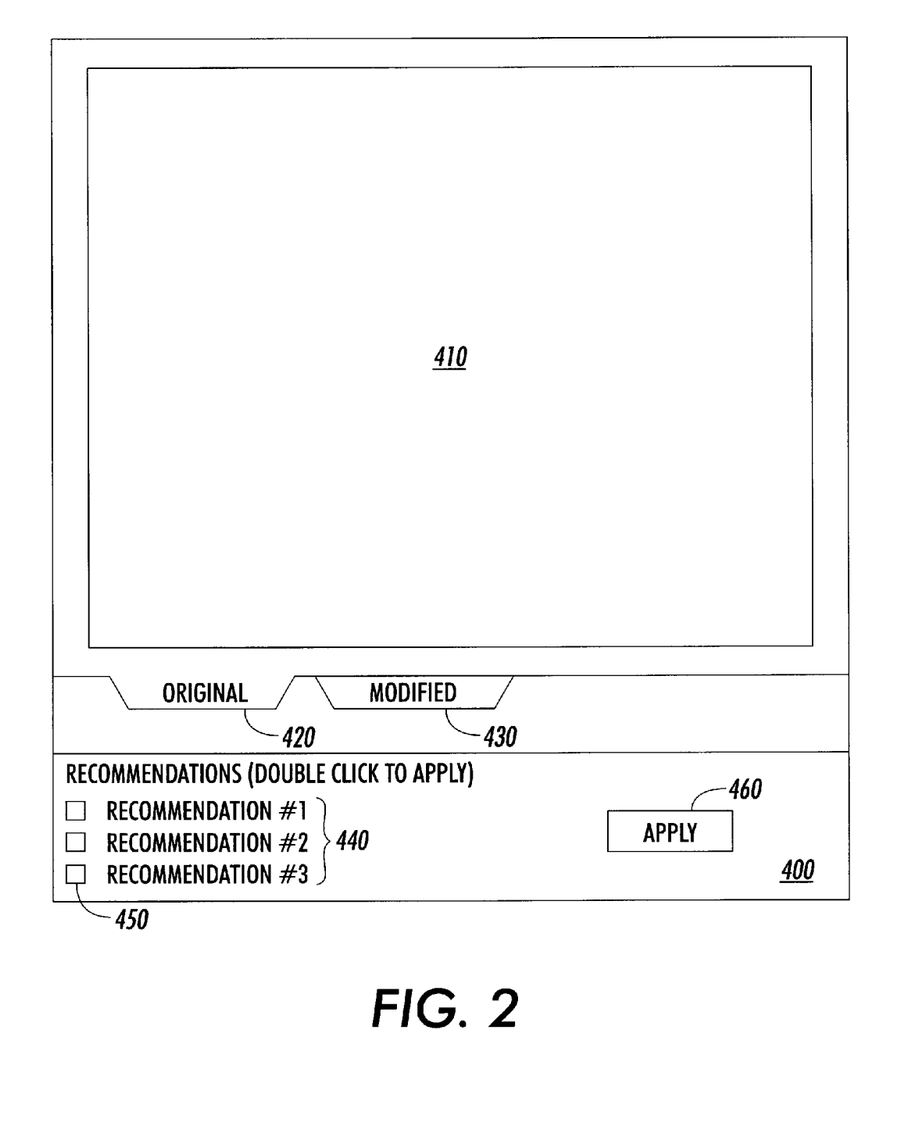
FIG. 2 is an exemplary embodiment of a graphical user interface according to this invention.

FIG. 2 is an exemplary embodiment of an image quality checker graphical user interface 400. The user views the original image 410, which is displayed on an original image tab 420 and reads the recommendations 440. The user can then decide to implement the recommendations by selecting a recommendation selection widget 450. As shown in FIG. 2, the selection widget in various exemplary embodiments is a check box. However, it should be appreciated that any known or later developed selection widget such as a radio button, a toggle button, or the like can be used. The recommendations can be applied immediately upon selecting the corresponding selection widget, or by selecting an apply widget 460.

The user can then select additional recommendations 440, or view a modified image (not shown) by selecting the modified image tab 430. Once the user finds the resulting image acceptable, the user can save the resulting image, have the image re-analyzed, output the image, etc.

In the exemplary embodiment shown in FIG. 2, the recommendation are either applied or not applied. However, it should be appreciated that, other sets of recommendation levels usable to select the levels or amounts of modification recommended such as "More/Original/Less" can be used.

In the exemplary embodiment shown in FIG. 2, the original image 410 and the original image tab 420 and modified image tab 430 are used to display the original and modified images to the user. Other methods such as split screens, multiple images/documents, or other means may be used to display the image 410 before and after modification. Additionally, only the original image 410 or only the modified image may be shown and used.

In the exemplary embodiment shown in FIG. 2, the recommendations 440 are positioned below the original image and modified image tabs 420 and 430. It should be appreciated that the recommendations can be positioned anywhere within the graphical user interface. Similarly, showing the recommendations 440 is optional. Various modifications will be obvious to those skilled in the art.

Figure 3:
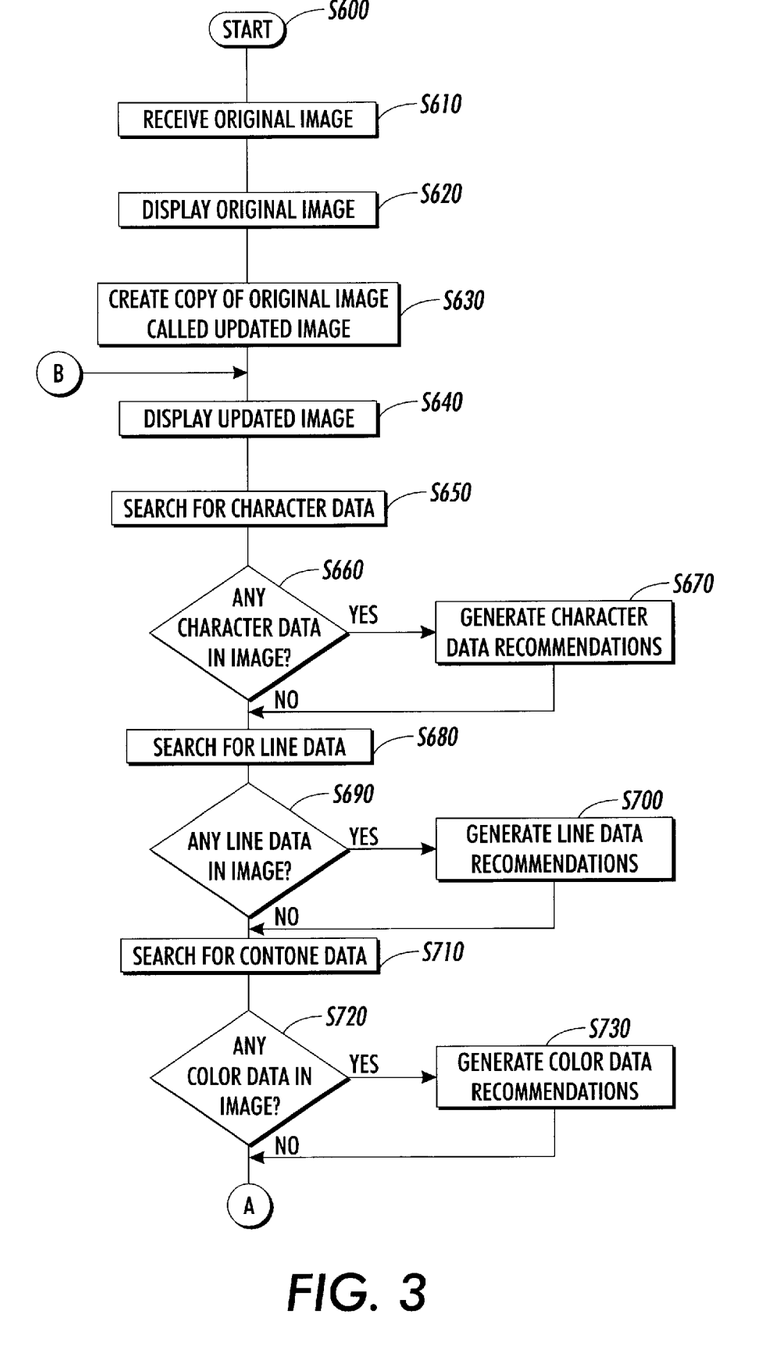
FIGS. 3A and 3B are a flowchart outlining one exemplary embodiment of a method for modifying image quality in accordance with of this invention.
Figure 4:
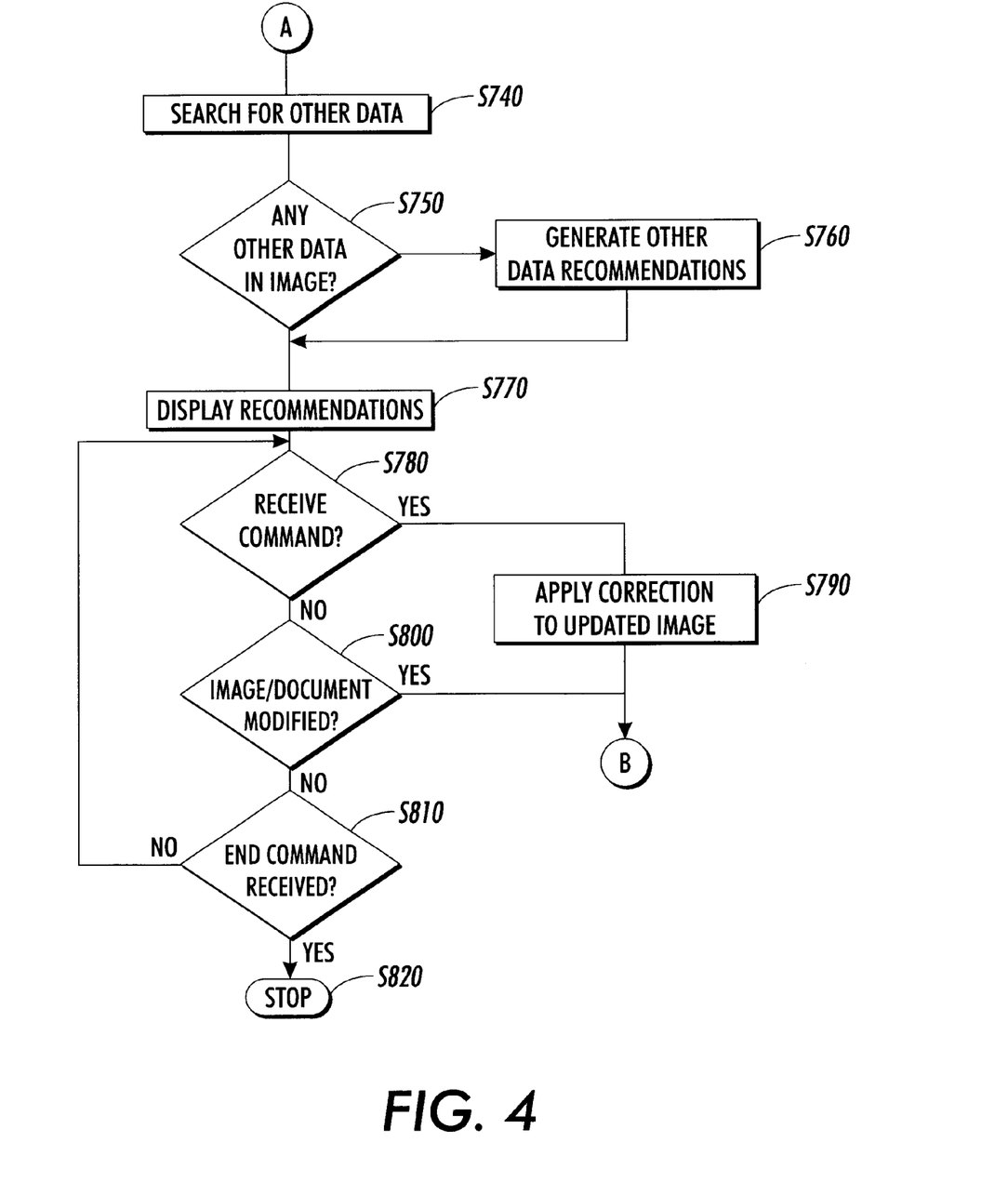
FIG. 4 is a flowchart outlining in greater detail one exemplary embodiment of a method for analyzing an image regarding character data quality.

FIGS. 3 and 4 are a flowchart outlining one exemplary embodiment of a method for checking image quality according to this invention. The process begins in step S600 and continues to step S610, where the original image data is received. The image data is received and can be converted to a format so as to be useful to the system. Next, in step S620, the image data is displayed to the user. Then, in step S630, a copy of the original image data, called the modified or updated image, is created for the system to use and apply changes to. Control then continues to step S640.

In step S640, the updated image data is displayed to the user. Then, in step S650, the image data is searched for character data. Next, in step S660, a determination is made whether character data is present. If character data is present, control continues to step S670. Otherwise, if character data is not present, control jumps directly to step S680. In step S670, recommendations for improving the image quality of the character data portions are generated. Control then passes to step S680.

Then, in step S680, the image data is searched for line data. Next, in step S690, a determination is made whether line data is present. If line data is present, control continues to step S700. Otherwise, if line data is not present, control jumps directly to step S710. In step S700, recommendations for improving the line data in the image data are generated. Control then passes to step S710.

In step S710, the image data is searched for color data. Then, in step S720, a determination is made whether color data is present. If color data is present, control continues to step S730. Otherwise, if color data is not present, control jumps directly to step S740. In step S720, recommendations for improving color data in the image data are generated. Control then passes to step S740.

In step S740, the image data is searched for any other type of image data for which the image quality of that other data needs to be improved. Then in step S750, a determination is made whether any other such data is present. If any other such data is present, control continues to step S760. Otherwise, if any other such data is not present, control jumps directly to step S770. In step S760, recommendations for improving the other such data in the image data are generated. Control then passes to step S770.

In step S770, the recommendations are displayed to the user. Then, in step S780, a determination is made whether a command has been received selecting a particular recommendation. If a command has been received, control continues to step S790. Otherwise, if a command has not been received, control jumps to step S800. In step S790, the selected recommendation is applied to the image. Control then jumps back to step S640. In contrast, in step S800, a determination is made whether the image has been modified. If a modification has been made, control jumps back to step S640. Otherwise, if a modification has not been made, control continues to step S810. In step S810, a determination is made whether an end command has been received. If no end command has been received, control jumps back to step S780. Otherwise, control continues to step S820, where the method stops.

The searches described above may be performed using any known or subsequently developed methods or techniques. In addition, the searches may tentatively identify data by any method known or later developed.

The recommendations described above may be generated using any known or subsequently developed method or techniques for analyzing the image data. The recommendations generated may take any form appropriate to the data, or desired by the user.

Figure 5:
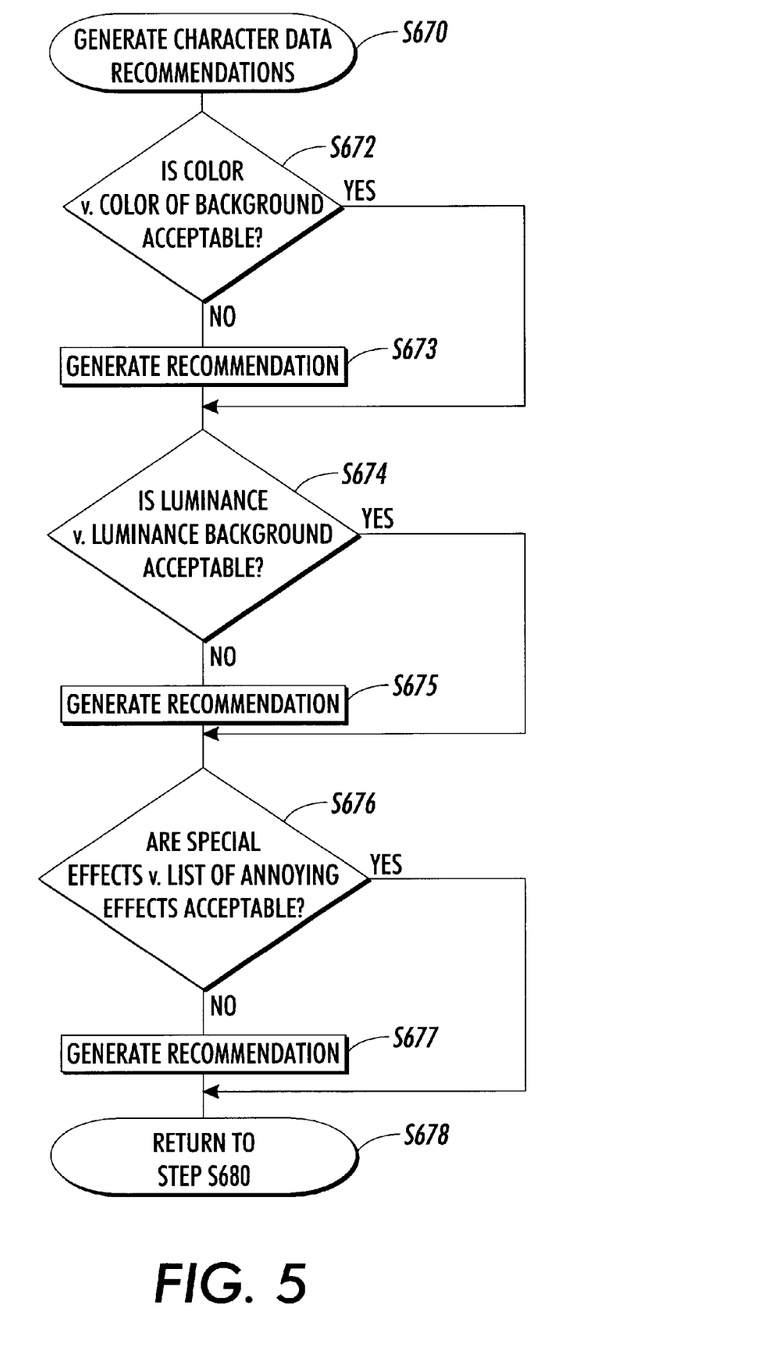
FIG. 5 is a flowchart outlining in greater detail one exemplary embodiment of a method for analyzing an image regarding line data quality.

FIG. 5 is a flowchart outlining in more detail one exemplary embodiment of a method for generating character data recommendations of step S670. Beginning in step S670, control continues to step S672, where a determination is made whether the color of the character data is acceptable when compared with the color of the background. If the color is not acceptable, control continues to step S673. Otherwise, if the color is acceptable, control jumps directly to step S674.

In step S673, a recommendation is generated regarding the background/foreground colors. For example, if character data is placed on a background of a similar tone, the character data is hard to read. A recommendation to either change the tone of the background, or to change the tone of the character data, to make the character data more readable can be generated.

In step S674, a determination is made whether the luminance of the character data is acceptable when compared with the luminance of the background. If the luminance is not acceptable, control continues to step S675. Otherwise, if the luminance is acceptable, control jumps directly to step S676.

In step S675, a recommendation is generated regarding the luminance. For example, if character data is placed on a background of a similar luminance, the character data is hard for color blind persons to read, regardless of the color differences. A recommendation to either change the luminance of the background, or to change the luminance of the character data to make the character data more readable can be generated.

In step S676, a determination is made whether the special effects of the character data is acceptable when compared with a list of annoying special effects. The special effects compared can be either a predetermined list of special effects or an algorithm that determines when a special effect has become annoying. If the special effects are not acceptable, control continues to step S677. Otherwise, if the special effects are acceptable, control jumps directly to step S678 where control returns to step S680.

In step S677, a recommendation is generated regarding any special effects that may be present. For example, one type of special effect is blinking data. If character data is made to blink, the character data is acceptable if the blink rate is slow, and the character data is the only item in the data that blinks. If the blink rate is too high, or too much data blinks, the character data is unacceptable. In this case, for this type of special effect, a recommendation to either change the rate of blink, or to remove the blink from the character data, to make the character data more readable can be generated.

Figure 6:
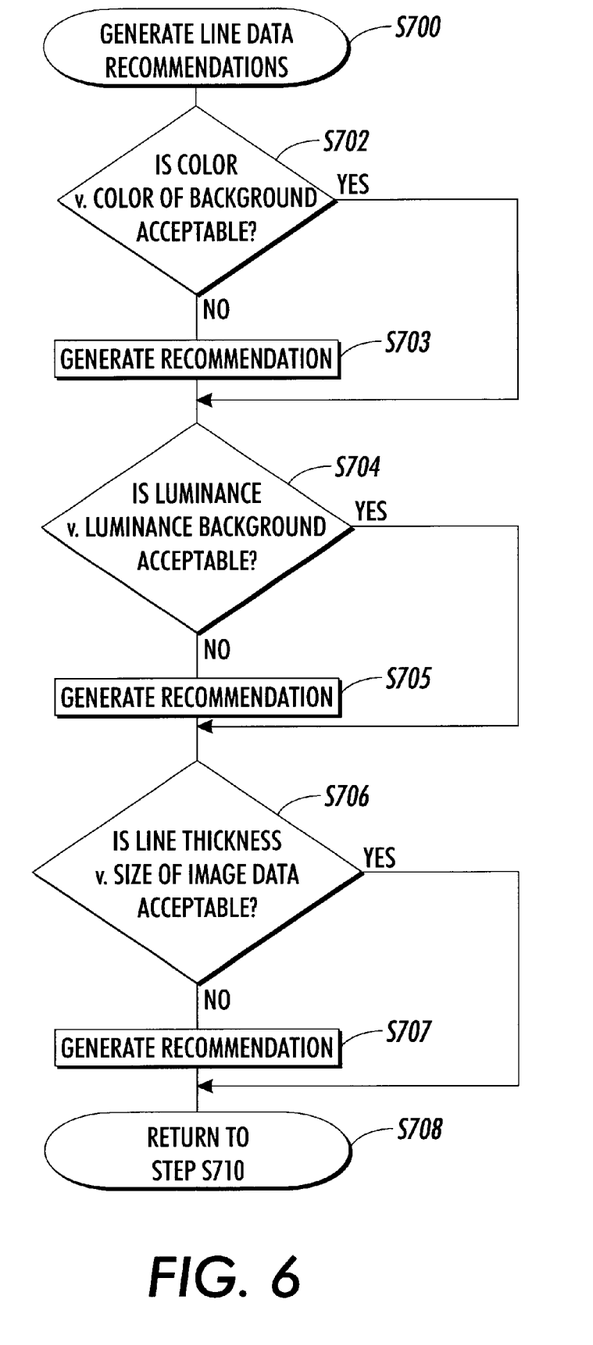
FIG. 6 is a flowchart outlining in greater detail one exemplary embodiment of a method for analyzing an image regarding color data quality.

FIG. 6 is a flowchart outlining in more detail one exemplary embodiment of a method for generating line data recommendations of step S700. Beginning in step S700, control continues to step S702, where a determination is made whether the color of the line data is acceptable when compared with the color of the background. If the color is not acceptable, control continues to step S703. Otherwise, if the color is acceptable, control jumps directly to step S704.

In step S703, a recommendation is generated regarding the line color. For example, if line data is placed on a background of a similar tone, the line data is hard to notice. A recommendation to either change the tone of the background, or to change the tone of the line data to make the line data more noticeable can be generated.

In step S704, a determination is made whether the luminance of the line data is acceptable when compared with the luminance of the background. If the luminance is not acceptable, control continues to step S705. Otherwise, if the luminance is acceptable, control jumps directly to step S706.

In step S705, a recommendation is generated regarding the luminance. For example, if line data is placed on a background of a similar luminance, the line data is hard for color blind persons to notice, regardless of the color differences. A recommendation to either change the luminance of the background, or to change the luminance of the line data to make the line data more noticeable can be generated.

In step S706, a determination is made whether the line thickness of the line data is acceptable when compared with the size of the image data. If the line thickness is not acceptable, control continues to step S707. Otherwise, if the line thickness is acceptable, control jumps directly to step S708, where control is returned to step S710.

In step S707, a recommendation is generated regarding the line thickness. For example, if the line data is less than 2% of the thickness of the data regions on either side, the line data is too thin. A recommendation to change the thickness to make the line data more noticeable can be generated.

Figure 7:
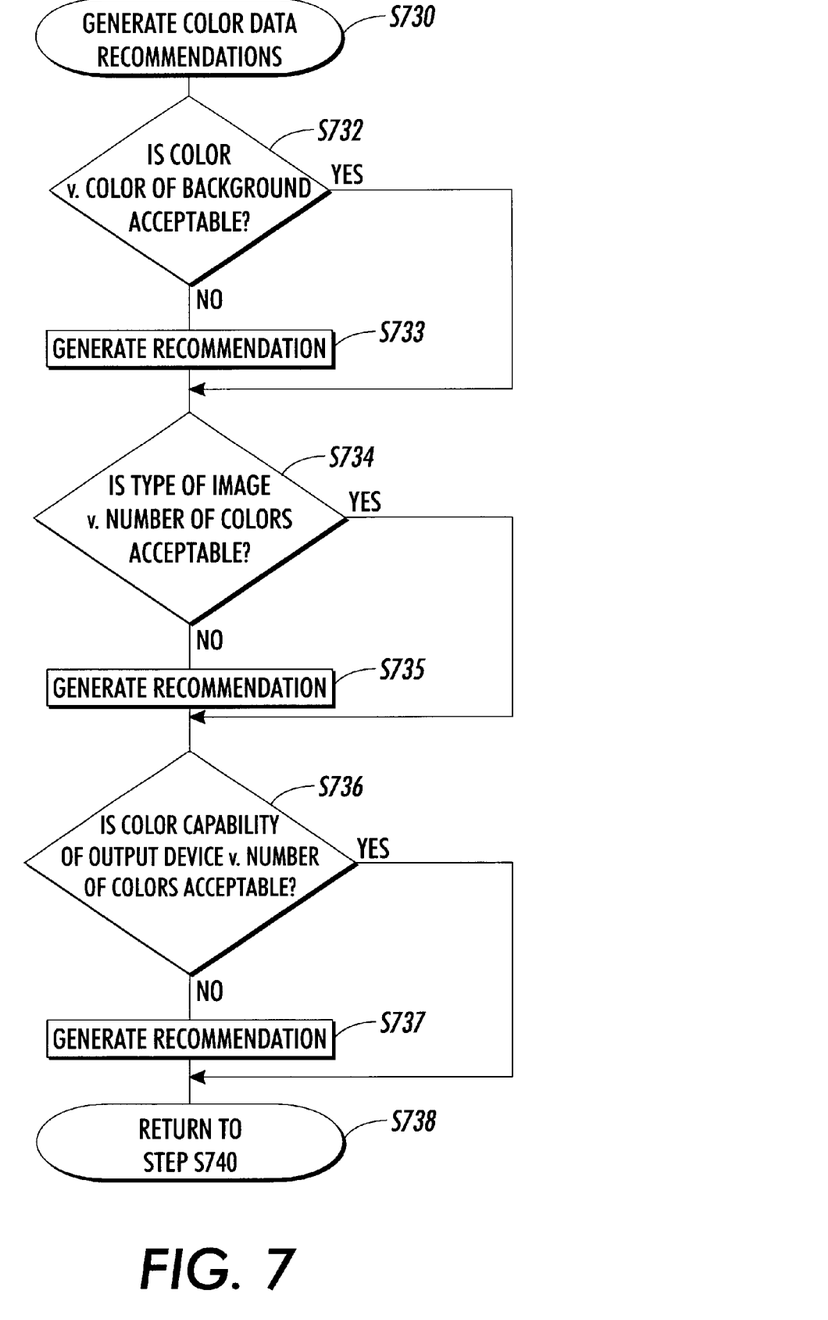
FIG. 7 is a flowchart outlining in greater detail one exemplary embodiment of a method for analyzing an image regarding OTHER data quality.

FIG. 7 is a flowchart outlining in more detail one exemplary embodiment of a method for generating color data recommendations of step S730. Beginning in step S730, control continues to step S732, where a determination is made whether the color of the color data is acceptable when compared with the color of the background. If the color is not acceptable, control continues to step S733. Otherwise, if the color is acceptable, control jumps directly to step S734.

In step S733, a recommendation is generated regarding the color. For example, if color data is placed on a background of a similar tone, the color data is hard to notice. A recommendation to either change the tone of the background, or to change the tone of the color data, to make the color data more noticeable can be generated.

In step S734, a determination is made whether the luminance of the color data is acceptable when compared with the luminance of the background. If the luminance is not acceptable, control continues to step S735. Otherwise, if the luminance is acceptable, control jumps directly to step S736.

In step S735, a recommendation is generated regarding luminance. For example, if color data is placed on a background of a similar luminance, the color data is hard for color blind persons to notice, regardless of the color differences. A recommendation to either change the luminance of the background, or to change the luminance of the color data, to make the color data more noticeable can be generated.

In step S736, a determination is made whether the color capability of the output device is acceptable when compared with the number of colors of the image data. If the number of colors is not acceptable, control continues to step S737. Otherwise, if the number of colors is acceptable, control jumps directly to step S738, where control returns to step S740.

In step S737, a recommendation is generated regarding the output device color capacity. For example, if number of colors is significantly higher than the capability of the output device, the image could be converted to a halftone or gray scale image. A recommendation to change the image data to halftone or gray scale can be generated.

Figure 8:
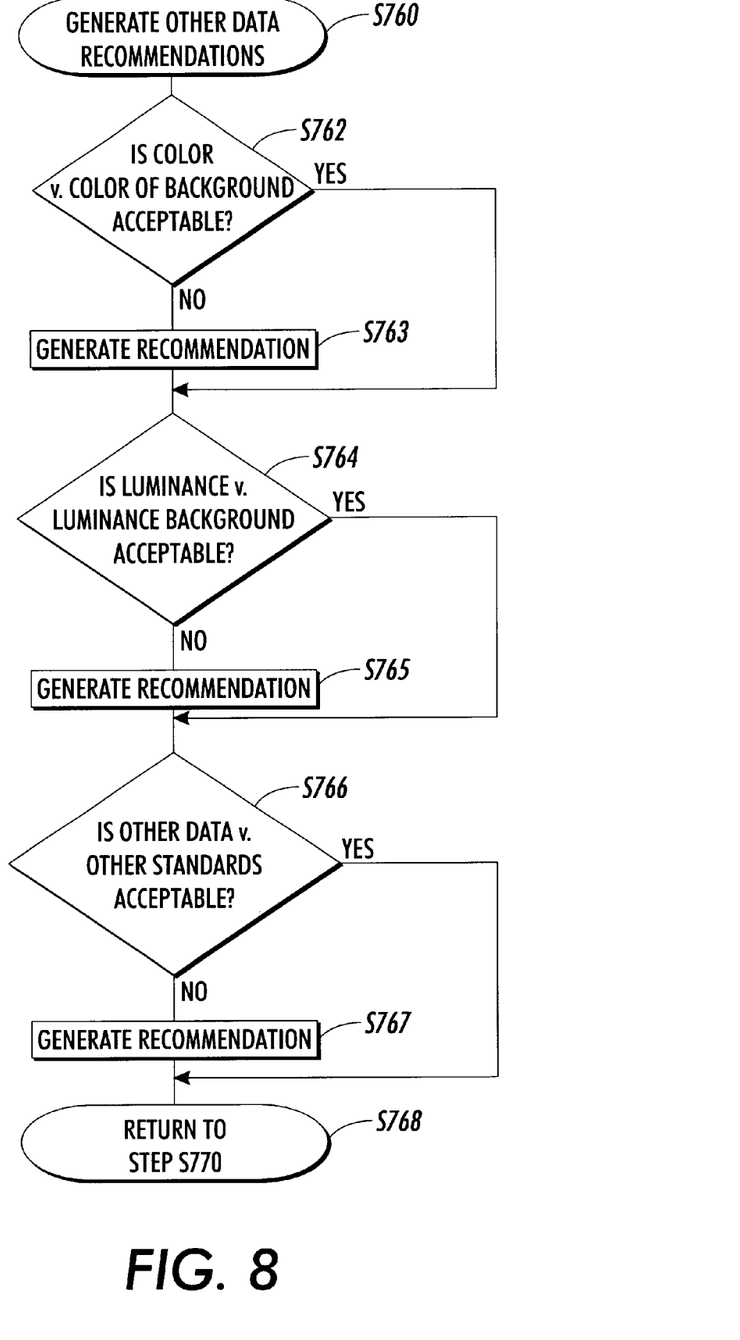

FIG. 8 is a flowchart outlining in more detail one exemplary embodiment of a method for generating other types of image data recommendations of step S760. Beginning in step S760, control continues to step S762, where a determination is made whether the color of the other types of image data is acceptable when compared with the color of the background. If the color is not acceptable, control continues to step S763. Otherwise, if the color is acceptable, control jumps directly to step S764.

In step S763, a recommendation is generated regarding the color of the other data. For example, if other types of image data are placed on a background of a similar tone, the other types of image data are hard to notice. A recommendation to either change the tone of the background, or to change the tone of the other types of image data, to make the other types of image data more noticeable can be generated.

In step S764, a determination is made whether the luminance of the other type of image data is acceptable when compared with the luminance of the background. If the luminance is not acceptable, control continues to step S765. Otherwise, if the luminance is acceptable, control jumps directly to step S766.

In step S765, a recommendation is generated regarding the luminance. For example, if other types of image data are placed on a background of a similar luminance, the other types of image data are hard for color blind persons to notice, regardless of the color differences. A recommendation to either change the luminance of the background, or to change the luminance of the other types of image data, to make the other types of image data more noticeable can be generated.

In step S766, a determination is made whether the other type of image data is acceptable when compared with other known or later developed standards. If the other types of image data are not acceptable, control continues to step S767. Otherwise, if the other types of image data is acceptable, control jumps directly to step S768, where control returns to step S770.

In step S767, a recommendation is generated regarding these other standards. A recommendation to change the other types of image data in any appropriate way can be generated.

In the various exemplary embodiments discussed above, to generate recommendations about any particular data, the background compared can be either the local background surrounding each individual piece of particular data or the generic image or document background.

It should be appreciated that any known or later developed method or techniques for analyzing the image data to identify particular data structures can be used. Further, the recommendations can be generated using any known or subsequently developed methods or techniques for generating recommendations.

It should be appreciated that the searches performed in steps S650, S680, S710, and S730 may tentatively identify the data structures mentioned above and generate recommendations based on these tentative recognitions. Various timings and processes for analyzing the image will be obvious without modifying the scope of the invention.

Once the user accepts the modified image, the modified image can be saved, outputted, or transferred to another program in steps not shown.

In various exemplary embodiments, the systems and methods according to this invention use acceptable, improvable and deficient as rating schemes. It should be appreciated that there are other comparisons and evaluations that may be made to generate recommendations of various sorts that are within the scope of this invention. Additionally, the recommendations generated may be of many types that vary from suggestions to requirements and from broad to very specific.

In a second exemplary embodiment of the systems and methods according to this invention, the recommendations described above may be automatically applied to the image data. This allows the user to quickly modify or improve the original or modified image quality of the image data.

Optionally, the recommendations may be linked to a help function or a file that explains why a particular recommendation is used so that the user can be educated in how to produce a quality color document.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for modifying electronic image data of an image to alter a perceived quality of the image, comprising:
    inputting the electronic image data, the electronic image data representing the image to be modified;
    analyzing the electronic image data to identify a plurality of data portions, each data portion representing a specific type of electronic data within the electronic image data;
    evaluating at least one of the plurality of identified data portion as one or more of at least acceptable, improvable or deficient based on one or more quality factors;

creating at least one quality recommendation for each evaluated data portion that is identified as at least one of at least improvable or deficient, wherein each quality recommendation identifies a modification that can be made to at least the corresponding data portion of the image data to alter the perceived quality of at least that corresponding data portion;

displaying at least one of the at least one quality recommendation;

allowing a user to selectively apply levels of a modification identified by the at least one quality recommendation; and allowing the user to select for display the original electronic image and the modified electronic image.

2. The method of claim 1, further comprising storing the quality recommendations.

3. The method of claim 1, further comprising, for at least one data portion, applying at least one of the at least one quality recommendation for that data portion to that data portion to alter the perceived quality of that data portion of the electronic image data.

4. The method of claim 3, further comprising re-evaluating at least one of the at least one data portion after at least one quality recommendation is applied to that data portion.

5. The method of claim 3, wherein:

at least one recommendation includes a recommended amount of modification; and applying the quality recommendation comprises applying at least one of the at least one quality recommendation that includes a recommended amount of modification in an amount of modification that is different than the recommended amount of modification.

6. The method of claim 5, wherein applying at least one of the at least one quality recommendation that includes a recommended amount of modification in an amount of modification that is different than the recommended amount of modification comprises one of:

applying a reduced amount of modification; and
applying an increased amount of modification.

7. The method of claims 6, wherein the electronic image data is re-evaluated after the applied amount of modification of a quality recommendation that includes a recommended amount of modification is increased or reduced.

8. The method of claim 1, wherein the electronic image data is one or more of a raster file, postscript file, JPG file, TIF file, BMP file, GIF file, scanner data, digital camera data, digital copier data, and facsimile device data.

9. The method of claim 1, wherein the electronic image data is a document file.

10. The method of claim 1, wherein the data portions are one or more of character, line, region, value and total colors.

11. The method of claim 1, further comprising modifying that electronic image data based on at least one of the at least one quality recommendation.

12. The method of claim 11, further comprising re-evaluating the data portion after the image data is modified.

13. An apparatus that modifies electronic image data of an image to alter a perceived quality of the image, comprising:

a memory structure that stores at least one of one or more quality recommendations, one or more quality factors, one or more data portion properties, and electronic image data;

at least one processing circuit that analyzes the electronic image data to identify a plurality of data portions of the electronic image data, each analyzed data portion representing a specific type of electronic data within the electronic image data;

at least one evaluation circuit capable of determining a feature of each analyzed data portion as one or more of at least acceptable, improvable or deficient and that generates at least one quality recommendation for at least one analyzed data portion, wherein each quality recommendation identifies a modification that can be made to at least the corresponding data portion of the electronic image data to alter the perceived quality of at least that corresponding data portion; and at least one modification circuit capable of selectively applying levels of a modification identified by the at least one quality recommendation and capable of displaying the original image and a modified image;

wherein the apparatus is capable of outputting electronic data in a format suitable for display of the original image and the image with at least one of the modifications identified by the at least one quality recommendations applied.

14. The apparatus of claim 13, wherein the at least one processing circuit applies at least one of the at least one quality recommendation to the corresponding at least one analyzed data portion.

15. The apparatus of claim 14, wherein the at least one processing circuit re-analyzes the image data after at least one of the at least one quality recommendation is applied.

16. The apparatus of claim 14, wherein:

at least one quality recommendation includes a recommended amount of modification; and the processing circuit applies at least one of the at least one quality recommendation that includes a recommended amount of modification in an amount of modification that is different than the recommended amount of modification.

17. The apparatus of claim 16, wherein the processing circuit re-analyzes the electronic image data after the quality recommendation is applied using the different amount of modification.

18. The apparatus of claim 13, wherein the processing circuit re-analyzes the image data after the image data has changed.

19. A graphical user interface, comprising:

a first display area that displays electronic image data from an image data source;

a second display area that displays at least one quality recommendation determined based on an evaluation of the electronic image data, wherein each quality recommendation identifies a modification that can be made to at least one of a plurality of portions of the electronic image data that have been identified as at least one of at least improvable or deficient to alter the perceived quality of at least that portion of the image data, each of the plurality of portions represents a specific type of electronic data within the electronic image; and a third display area capable of displaying the electronic image data with at least one of the modifications identified by the at least one quality recommendations applied.

20. The graphical user interface of claim 19, wherein each of the at least one recommendation is selectable.

21. The graphical user interface of claim 19, wherein:

at least one quality recommendation includes a recommended amount of modification; and the amount of modification of at least one quality recommendation that includes a recommended amount of modification, to be applied to the electronic image data is incrementally selectable.

* * * * *